United States Patent
Funabashi

(10) Patent No.: US 8,762,042 B2
(45) Date of Patent: Jun. 24, 2014

(54) PERIPHERY VEHICLE DETERMINATION APPARATUS

(71) Applicant: Denso Corporation, Kariya (JP)

(72) Inventor: Junichiro Funabashi, Nagoya (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 13/846,236

(22) Filed: Mar. 18, 2013

(65) Prior Publication Data

US 2013/0261948 A1    Oct. 3, 2013

(30) Foreign Application Priority Data

Mar. 27, 2012 (JP) ................ 2012-072051

(51) Int. Cl.
G05D 1/02    (2006.01)

(52) U.S. Cl.
CPC ............ G05D 1/0295 (2013.01); G05D 1/0257 (2013.01); G05D 1/0293 (2013.01)
USPC ............. 701/300; 701/96; 701/117; 340/903; 340/988

(58) Field of Classification Search
USPC ........................................................ 701/117
See application file for complete search history.

(56) References Cited

U.S. PATENT DOCUMENTS

| 5,680,122 A * | 10/1997 | Mio ............................. 340/932 |
| 6,032,097 A | 2/2000 | Iihoshi et al. |
| 2006/0155428 A1 * | 7/2006 | Imai .................................. 701/1 |

FOREIGN PATENT DOCUMENTS

| JP | 9-81899 A | 3/1997 |
| JP | 10-162282 A | 6/1998 |
| JP | 11-321380 A | 11/1999 |
| JP | 2002-222491 A | 8/2002 |
| JP | 2007-280060 A | 10/2007 |
| JP | 2010-213044 A | 9/2010 |

* cited by examiner

Primary Examiner — John R Olszewski
Assistant Examiner — Jeffrey Boomer

(57) ABSTRACT

A periphery vehicle determination apparatus disposed in a host vehicle includes a behavior obtaining section obtaining a behavior related information of an immediately adjacent object, a vehicle-to-vehicle communication device, an information obtaining section obtaining vehicle information sets from periphery vehicles, a specifying section specifying a vehicle information set from an immediately adjacent vehicle based on the behavior related information, a transceiving section transmits and receives an immediately adjacent information, and an anteroposterior relation determination section specifying an anteroposterior relation of the periphery vehicles in a one-dimensional direction by correlating the immediately adjacent informations transmitted from the periphery vehicles based on a repeated identification information included in at least two of the immediately adjacent informations.

9 Claims, 7 Drawing Sheets

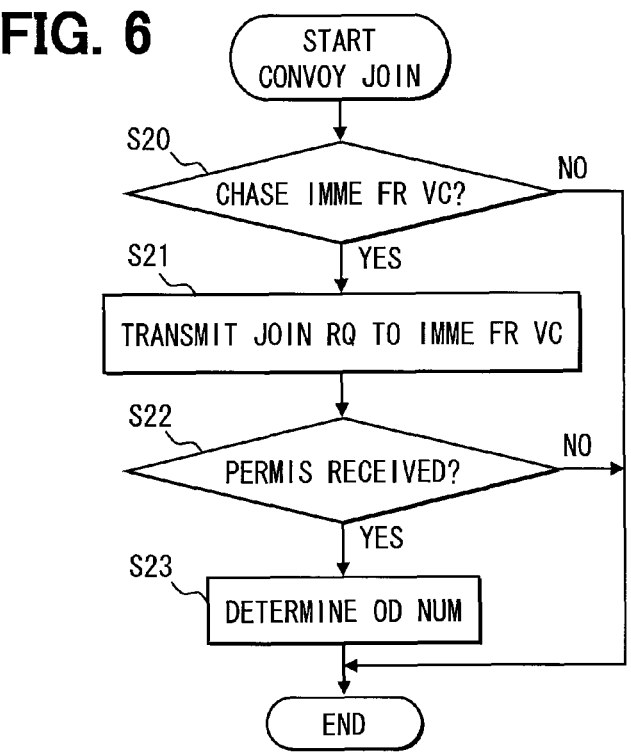
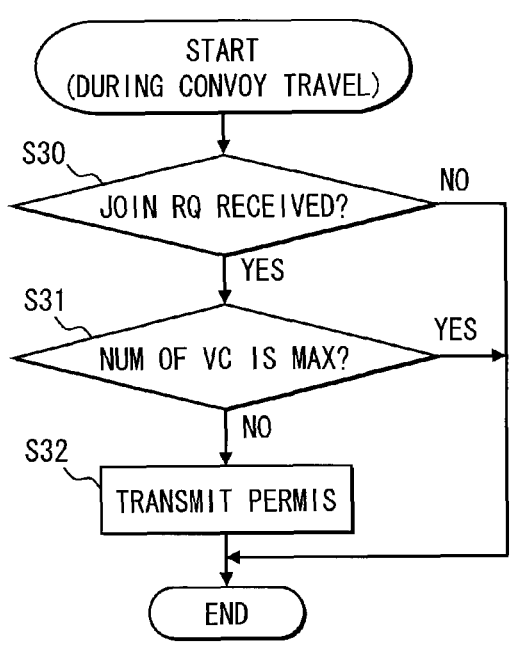

PERIPHERY VEHICLE DETERMINATION APPARATUS

CROSS REFERENCE TO RELATED APPLICATION

This application is based on Japanese Patent Application No. 2012-072051 filed on Mar. 27, 2012, the disclosure of which is incorporated herein by reference.

TECHNICAL FIELD

The present disclosure relates to a periphery vehicle determination apparatus, more particularly, the present disclosure relates to a periphery vehicle determination apparatus which determines an anteroposterior relation of periphery vehicles traveling in one-dimensional direction with respect to a host vehicle.

BACKGROUND

Conventionally, a technique that determines an immediately front vehicle with respect to a host vehicle is disclosed in, for example, JP 2002-222491 A. In JP 2002-222491 A, an apparatus, which is equipped in the host vehicle, detects inter-vehicle distances to multiple front vehicles based on position information received from a global positioning system (GPS). At the same time, the apparatus detects a distance from the host vehicle to a front object based on a detection value received from a radar detector. The apparatus determines then one of the front vehicles as the immediately front vehicle when one of the detected inter-vehicle distances is equal to the distance from the host vehicle to the front object.

Further, a technique that determines an anteroposterior relation of vehicles traveling in a convoy is disclosed in, for example, JP H09-081899 A (corresponding to U.S. Pat. No. 5,680,122). In JP H09-081899 A, an apparatus changes an identification number from a leading vehicle in the convoy based on a predetermined rule, and transmits the identification number to an immediately following vehicle. Herein, the predetermined rule may be increasing a value of the identification number by one at one time. With this configuration, an order number of each vehicle included in the convoy can be identified.

The host vehicle in JP 2002-222491 A uses the radar detector. Thus, the host vehicle can specify only the immediately front vehicle and the immediately following vehicle. Further, in JP H09-081899 A, only the anteroposterior relation of the vehicles traveling in the convoy is determined.

Usually, there are many vehicles traveling on the road. Thus, not only a behavior of the immediately front vehicle, but also behaviors of front vehicles traveling in front of the immediately front vehicle are necessary to improve a safety of a driving. For example, when one of the front vehicles in front of the immediately front vehicle decelerates, a driver of the host vehicle may be informed the deceleration before the immediately front vehicle decelerates. Thus, the driver may promptly control the host vehicle to take a necessary action.

When the host vehicle is equipped with a vehicle-to-vehicle communication device, the driver can be informed of behavior information of the vehicles within a communication range of the communication device. When one of the front vehicles decelerates, a deceleration timing and a deceleration degree differs based on the anteroposterior relation between the host vehicle and the decelerated front vehicle. In order to perform a vehicle control with a high accuracy, the anteroposterior relation between a target vehicle and the host vehicle needs to be determined. Herein, the target vehicle is the vehicle from which the behavior information is received. The anteroposterior relation between the target vehicle and the host vehicle signifies an order number and a position direction of the target vehicle with respect to the host vehicle. Usually, the host vehicle receives behavior information from multiple vehicles through a vehicle-to-vehicle communication. Thus, identifying a subject vehicle of each behavior information is difficult.

Further, in JP 2002-222491 A, only the immediately front vehicle is specified. That is, other front vehicles and following vehicles apart from the host vehicle are not specified. In JP H09-081899 A, only the anteroposterior relation of the vehicles traveling in the convoy is specified.

SUMMARY

In view of the foregoing difficulties, it is an object of the present disclosure to provide a periphery vehicle determination apparatus which determines an anteroposterior relation of periphery vehicles.

According to an aspect of the present disclosure, a periphery vehicle determination apparatus disposed in a host vehicle includes a behavior obtaining section, a vehicle-to-vehicle communication device, an information obtaining section, a specifying section, a transceiving section, and an anteroposterior relation determination section. The behavior obtaining section obtains a behavior related information of an immediately adjacent object of the host vehicle. The immediately adjacent object refers to one of an immediately front object and an immediately following object. The behavior related information includes at least one of a position of the immediately adjacent object and a speed related parameter of the immediately adjacent object. The vehicle-to-vehicle communication device communicates with a plurality of periphery vehicles. The information obtaining section obtains a plurality of vehicle information sets from the periphery vehicles via the vehicle-to-vehicle communication device. Each of the vehicle information sets includes an identification information of a respective one of the periphery vehicles. The specifying section specifies one of the vehicle information sets obtained by the information obtaining section as being from an immediately adjacent vehicle based on the behavior related information of the immediately adjacent object obtained by the behavior obtaining section. The specifying section then specifies the identification information of the immediately adjacent vehicle based on the vehicle information set specified as from the immediately adjacent vehicle. The immediately adjacent vehicle is one of an immediately front vehicle and an immediately following vehicle of the host vehicle. The immediately front vehicle and the immediately following vehicle are part of the plurality of periphery vehicles. The transceiving section transmits an immediately adjacent information of the host vehicle to the periphery vehicles and receives a plurality of immediately adjacent informations from the periphery vehicles via the vehicle-to-vehicle communication device. The immediately adjacent information of the host vehicle includes an identification information of the host vehicle, the identification information of the immediately adjacent vehicle, and an anteroposterior relation between the host vehicle and the immediately adjacent vehicle. The anteroposterior relation determination section specifies an anteroposterior relation of at least two of the periphery vehicles in a one-dimensional direction by correlating the immediately adjacent informations transmitted from the periphery vehicles according to a repeated identification information that is the identification information included in at least two of the immediately adjacent informations from the periphery vehicles. The one-dimensional direction is defined as along the travel direction of the host vehicle at least one of a forward direction with respect to the host vehicle and a backward direction with respect to the host vehicle.

In the above apparatus, the anteroposterior relation determination section specifies the anteroposterior relation of at least two of the periphery vehicles in the one-dimensional direction by correlating the immediately adjacent informations transmitted from the periphery vehicles. Thus, when the host vehicle travels in a convoy, the anteroposterior relation of the periphery vehicles included in the convoy and the anteroposterior relation of the periphery vehicles out of the convoy are determined. Further, when the host vehicle travels out of the convoy, the anteroposterior relation of the periphery vehicles in the convoy is determined.

BRIEF DESCRIPTION OF THE DRAWINGS

The above and other objects, features and advantages of the present disclosure will become more apparent from the following detailed description made with reference to the accompanying drawings. In the drawings:

FIG. 6 is a flowchart showing a convoy joining process executed by the controller when a host vehicle joins a convoy travel;

FIG. 7 is a flowchart showing a process periodically executed by the controller in order to respond to a convoy joining request transmitted from a following vehicle during the convoy travel;

DETAILED DESCRIPTION

Figure 1:
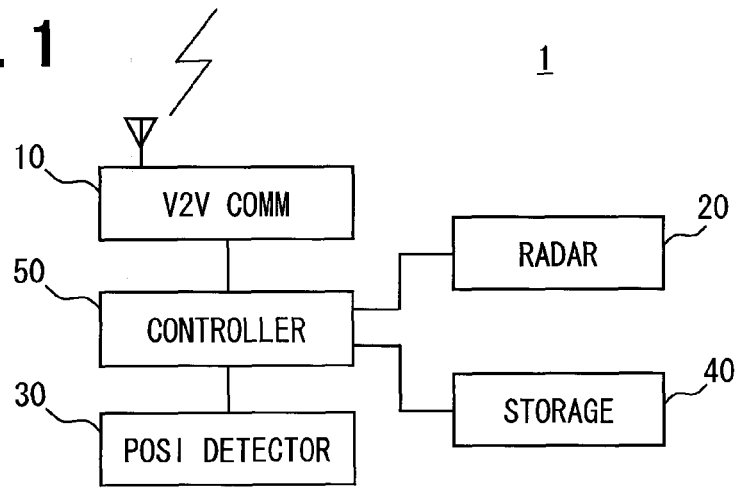
FIG. 1 is a block diagram of a periphery vehicle determination apparatus according to an embodiment of the present disclosure.

The following will describe an embodiment of the present disclosure with reference to the drawings. As shown in FIG. 1, a periphery vehicle determination apparatus 1 disposed in a host vehicle includes a vehicle-to-vehicle communication device (V2V COMM) 10, a radar detector (RADAR) 20, a position detector (POSI DETECTOR) 30, and a storage device (STORAGE) 40, and a controller 50.

The vehicle-to-vehicle communication device 10 is a well-known vehicle-to-vehicle communication device that performs a wireless communication using 700 megahertz (MHz) band, 5.8 gigahertz (GHz) band and the like. The vehicle-to-vehicle communication device 10 may perform a bidirectional point-to-point communication, such as a unicast communication, with a target vehicle. The vehicle-to-vehicle communication device 10 may further perform a broadcast communication without specifying the target vehicle.

The radar detector 20 emits an electromagnetic wave in a forward direction with respect to the host vehicle, and detects a reflected wave of the electromagnetic wave. The controller 50 controls the radar detector 20 to emit the electromagnetic wave. When the radar detector 20 detects the reflected wave, the radar detector 20 transmits, to the controller 50, a signal indicating that the reflected wave is detected. For example, a millimeter-wave radar and a radar laser may be used as the radar detector 20. The controller 50 obtains a distance to an immediately front object with respect to the host vehicle based on the signal transmitted from the radar detector 20. The distance may also be referred to as a relative position of an immediately adjacent object. A change of the distance over time is referred to as a relative speed of the immediately adjacent object. The distance to the immediately adjacent object is used as behavior related information of the immediately adjacent object, and the radar detector 20 may operate as a behavior obtaining section.

The position detector 30 sequentially detects a current position of the host vehicle. For example, the position detector 30 may have a GPS receiver, and determines coordinates of the current position of the host vehicle.

The storage device 40 stores multiple vehicle information sets, which are transmitted from periphery vehicles and received by the vehicle-to-vehicle communication device 10. Further, the storage device 40 stores an inter-vehicle distance to an immediately front vehicle detected based on the signal transmitted from the radar detector 20 and relative distances to the periphery vehicles. In fact, the radar detector 20 cannot determine whether the immediately front object is a vehicle or an object other than the vehicle. However, the immediately front object of the host vehicle during a traveling is usually considered as a vehicle. Thus, the immediately front object is considered as the immediately front vehicle, and the distance to the immediately front object is considered as the inter-vehicle distance to the immediately front vehicle. The relative distances to the periphery vehicles are determined based on the coordinates of the current position of the host vehicle. The storage device 40 further stores other necessary information. Herein, the immediately front vehicle is a closest vehicle in the forward direction with respect to the host vehicle, and the periphery vehicles refer to vehicles traveling around the host vehicle.

The controller 50 is a well-known computer which includes a central processing unit (CPU), a read only memory (ROM), a random access memory (RAM) and the like. The CPU of the controller 50 executes a program stored in the ROM assisted by a temporary storage function of the RAM. The CPU of the controller 50 executes the program in order to control the vehicle-to-vehicle communication device 10, the radar detector 20, the position detector 30, and the storage device 40. Further, the controller 50 periodically executing a vehicle information transmission process in which the controller 50 generates and transmits a host vehicle information set. At the same time, the controller 50 executes an anteroposterior relation determination process in which the controller 50 sequentially determines an anteroposterior relation of vehicles traveling along the same traffic line with the host vehicle. Herein, the anteroposterior relation refers to a front to back relationship of the vehicles traveling along the same traffic line. Hereinafter, a direction along the same traffic line is also referred to as one-dimensional direction. More specifically, the one-dimensional direction is the forward direction with respect to the host vehicle or a backward direction with respect to the host vehicle.

Figure 2:
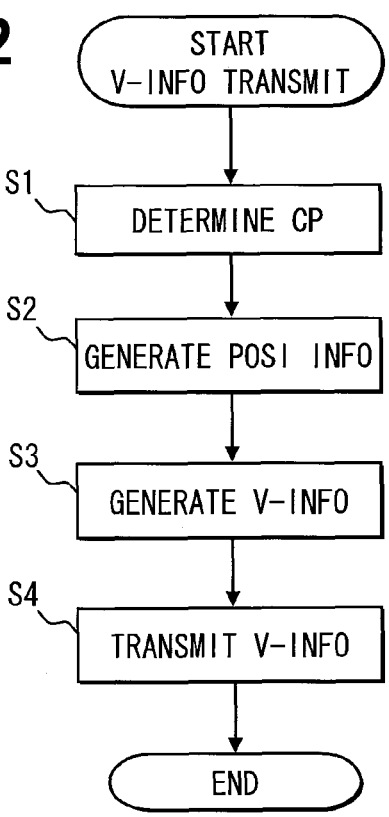
FIG. 2 is a flowchart showing a vehicle information transmission process executed by a controller of the periphery vehicle determination apparatus.

As shown in FIG. 2, when the vehicle information transmission process (V-INFO TRANSMIT) starts, at S1, the controller 50 specifies the coordinates of the current position (CP) of the host vehicle. Specifically, the controller 50 specifies the current position of the host vehicle based on a detection signal obtained from the position detector 30.

At S2, the controller 50 generates position related information (POSI INFO). The position related information includes the current position of the host vehicle determined at S1. The position related information further includes the number of vehicles traveling in a convoy in which the host vehicle is traveling. When an order number of the host vehicle in the convoy is determined, the position related information also includes the order number of the host vehicle. Further, the order number of each vehicle traveling in the convoy may be determined with a leading vehicle as a reference or with a tail end vehicle as a reference. Hereinafter, an order with the leading vehicle as the reference (start point) is referred to as a first order, and an order with the tail end vehicle as the reference (start point) is referred to as a second order. Further, the order number of the host vehicle determined based on the first order is referred to as a first order number, and the order number of the host vehicle determined based on the second order is referred to as a second order number. When the number of vehicles traveling in the convoy is determined, one of the first order number and the second order number is determined in addition to the number of vehicles as information indicating the position of the host vehicle in the convoy. When the number of vehicles traveling in the convoy is not determined, the first order number and the second order number are determined as the information indicating the position of the host vehicle in the convoy.

At S3, the controller 50 generates the host vehicle information set (V-INFO). The host vehicle information set includes the position related information generated at S2, a host vehicle identification (ID), a speed of the host vehicle, and an acceleration of the host vehicle. The host vehicle ID is information for identifying the host vehicle. At least one of the speed and the acceleration of the host vehicle is also referred to as a speed related parameter of the host vehicle. At least one of the position of the host vehicle included in the position related information and the speed related parameter of the host vehicle is referred to as behavior related information of the host vehicle. Accordingly, the process executed at S3 is also referred to as a behavior related information generating section that generates the behavior related information of the host vehicle. The host vehicle information set may further include a signal of an acceleration switch, a signal of a brake switch, and the inter-vehicle distance detected by the radar detector 20. The host vehicle information set may further include a convoy joining request transmitted to the immediately front vehicle and a permission signal in response to the convoy joining request. The host vehicle ID may be stored in the storage device 40, the ROM of the controller 50 or the like.

At S4, the controller 50 controls the vehicle-to-vehicle communication device 10 to transmit the host vehicle information set in a broadcast manner.

Figure 3:
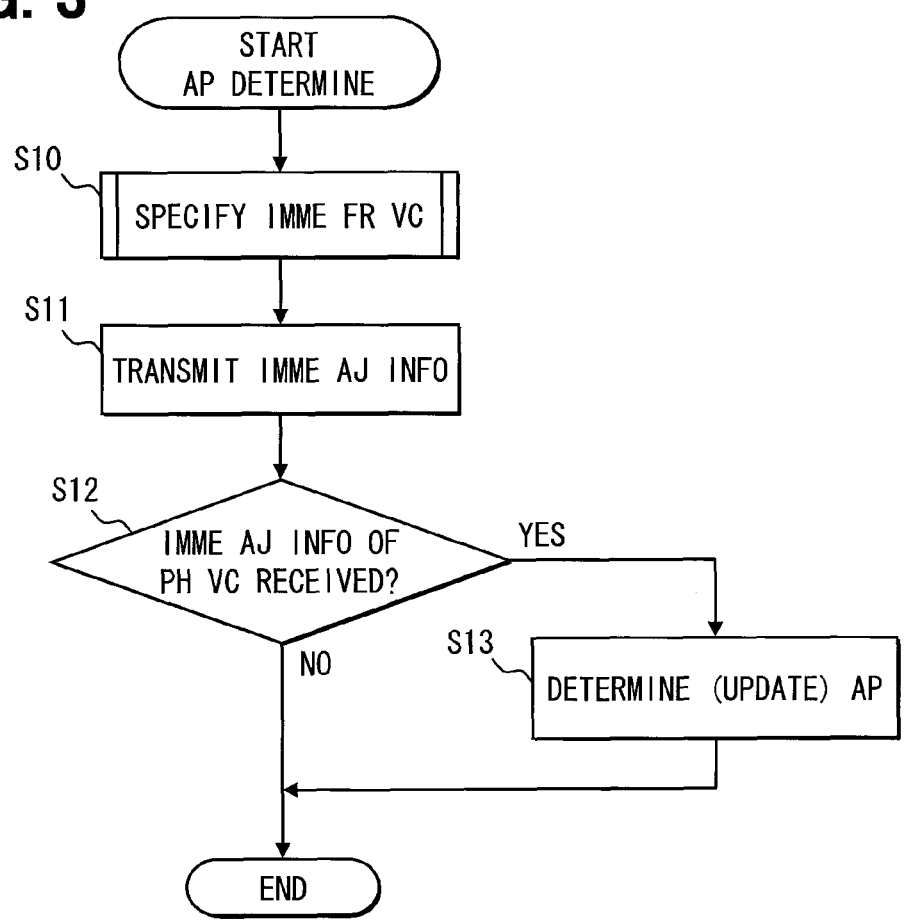
FIG. 3 is a flowchart showing an anteroposterior relation determination process executed by the controller of the periphery vehicle determination apparatus.

The following will describe the anteroposterior relation determination process (AP DETERMINE) with reference to FIG. 3. The controller 50 periodically executes the anteroposterior relation determination process shown in FIG. 3. At S10, the controller 50 executes an immediately front vehicle specifying process in which the immediately front vehicle (IMME FR VC) is specified.

Figure 4:
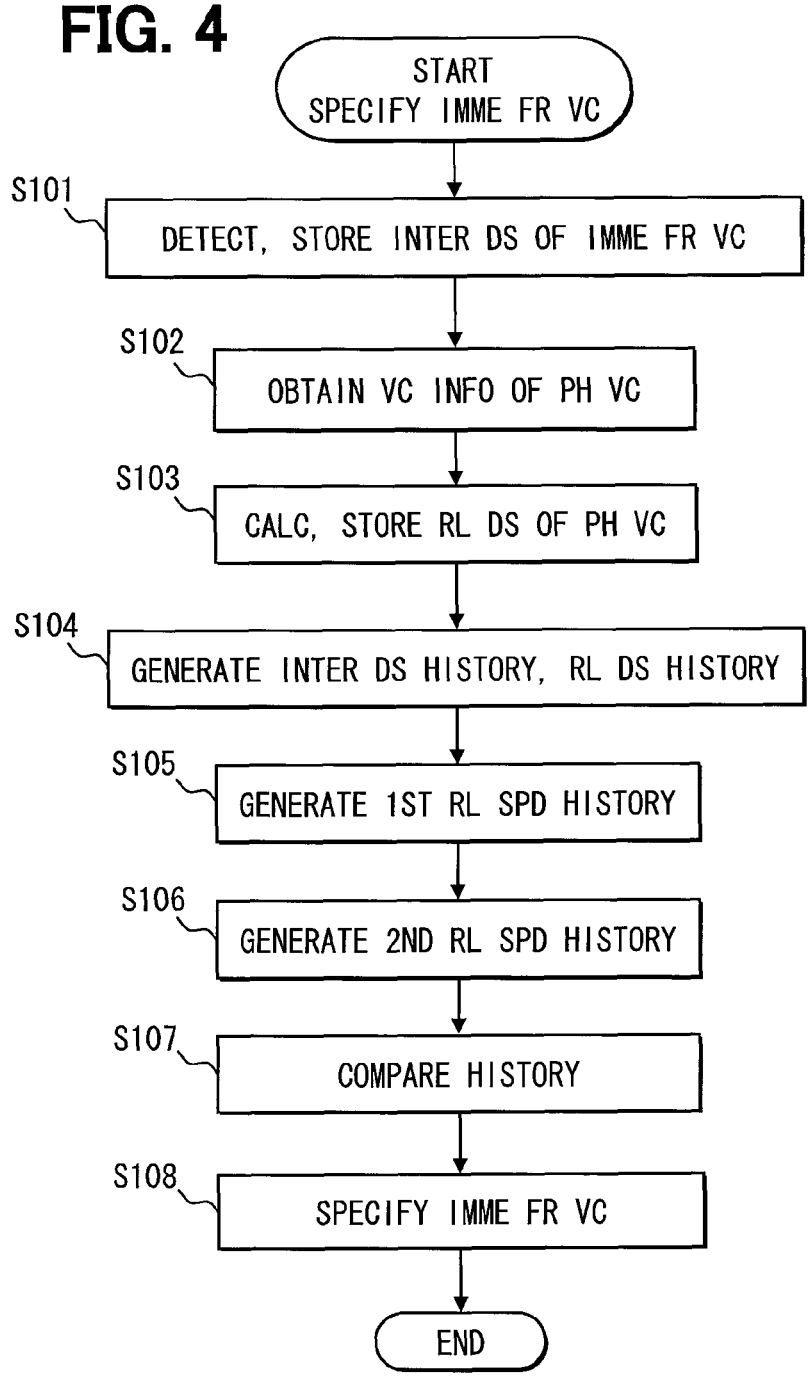
FIG. 4 is a flowchart showing an immediately front vehicle specifying process executed in FIG. 3.

The following will describe the immediately front vehicle specifying process with reference to FIG. 4.

At S101, the radar detector 20 emits an electromagnetic wave in the forward direction of the host vehicle, and detects a reflected wave of the electromagnetic wave. Then, the radar detector 20 determines a distance to the immediately front object based on a time difference between an emitting time and a receiving time of the electromagnetic wave. The radar detector 20 cannot determine whether the immediately front object is a vehicle or an object other than the vehicle. However, the immediately front object of the host vehicle during a traveling is usually considered as a vehicle. Thus, the immediately front object is considered as the immediately front vehicle, and the distance to the immediately front object is considered as the inter-vehicle distance to the immediately front vehicle. The inter-vehicle distance (INTER DS) is stored in the storage device 40.

At S102, the controller 50 obtains the vehicle information sets transmitted from the periphery vehicles. A process executed at S102 may operate as an information obtaining section. Each vehicle information set of each periphery vehicle is generated by a periphery vehicle determination apparatus equipped in each periphery vehicle. Similar to the periphery vehicle determination apparatus equipped in the host vehicle, the periphery vehicle determination apparatus equipped in each periphery vehicle executes the process shown in FIG. 2 to generate and transmit the vehicle information set of each periphery vehicle. The host vehicle receives each vehicle information set of each periphery vehicle via the vehicle-to-vehicle communication device 10. The vehicle information sets of the periphery vehicles are stored in the storage device 40. Thus, at S102, the controller 50 obtains the vehicle information sets of the periphery vehicles from the storage device 40.

At S103, the controller 50 calculates a relative distance (RL DS) to each periphery vehicle based on coordinates of a current position of each periphery vehicle and the coordinates of the current position of the host vehicle. The coordinates of the current position of each periphery vehicle is included in the vehicle information set obtained at S102, and the coordinates of the current position of the host vehicle is determined at S1 in FIG. 2. Hereinafter, one of the periphery vehicles is used to describe a method of calculating the relative distance, and the one of the periphery vehicles is referred to as a subject periphery vehicle. Specifically, first, the controller 50 calculates a coordinate based distance between the current position of the host vehicle and the current position of the subject periphery vehicle. The controller 50 then subtracts a first equipment distance of the position detector 30 of the host vehicle and a second equipment distance of the position detector 30 of the subject periphery vehicle from the coordinate based distance in order to calculate the relative distance to the subject periphery vehicle. The first equipment distance of the position detector 30 of the host vehicle is a distance from a position of the position detector 30 with respect to the host vehicle to an adjacent end of the host vehicle along a line that connects the position detector 30 equipped in the host vehicle and the position detector 30 equipped in the subject periphery vehicle. Herein, the adjacent end of the host vehicle is an end of the host vehicle, which is closest to the subject periphery vehicle along the lint that connects the position detector 30 equipped in the host vehicle and the position detector 30 equipped in the subject periphery vehicle. The second equipment distance of the position detector 30 of the subject periphery vehicle is a distance from a position of the position detector 30 with respect to the subject periphery vehicle to an adjacent end of the subject periphery vehicle along the line that connects the position detector 30 equipped in the host vehicle and the position detector 30 equipped in the subject periphery vehicle. Herein, the adjacent end of the subject periphery vehicle is an end of the subject periphery vehicle, which is closest to the host vehicle along the lint that connects the position detector 30 equipped in the host vehicle and the position detector 30 equipped in the subject periphery vehicle. The controller 50 stores the relative distances to the periphery vehicles in the storage device 40.

At S104, the controller 50 generates an inter-vehicle distance history data (INTER DS HISTORY) of the immediately front vehicle based on the inter-vehicle distances, which are determined based on the signals transmitted from the radar detector 20 and stored in the storage device 40. The inter-vehicle distances include distances detected for a predetermined time period retroactively as of the current time. Further, the controller 50 generates a relative distance history data (RL DS HISTORY) for each periphery vehicle based on the relative distances to the corresponding vehicle. Similar to the inter-vehicle distance history data, the relative distance history data is generated based on the relative distances to the corresponding vehicle detected for the predetermined time period. As described above, the relative distances to the corresponding vehicle are detected and calculated by the controller 50, and stored in the storage device 40.

At S105, the controller 50 differentiates the inter-vehicle distance history data with respect to time in order to generate a first relative speed history data (1ST RL SPD HISTORY). When the radar detector 20 is provided as the millimeter-wave radar, which is capable of determining a relative speed of the immediately front vehicle based on doppler shift measurement, the controller 50 may generate the first relative speed history data directly based on detected values of the millimeter-wave radar. In this case, at least one of the speed and the acceleration of the immediately front vehicle is used as the behavior related information.

At S106, the controller 50 generates a second relative speed history data (2ND RL SPD HISTORY) for each periphery vehicle based on the vehicle information set, which is transmitted from a corresponding periphery vehicle and stored in the storage device 40, and the speed of the host vehicle at a corresponding time. Further, the inter-vehicle distances detected at S101, the inter-vehicle distance history data generated at S104, the first relative speed history data generated at S105 correspond to a relative behavior of the immediately front vehicle. The processes executed at S101, S104, S105 may operate as a first behavior determination section. The relative distances calculated at S103, the relative distance history data generated at S104, the second relative speed history data generated at S106 correspond to relative behavior of a periphery vehicle. The processes executed at S103, S104, S106 may operate as a second behavior determination section.

At S107, the controller 50 compares the inter-vehicle distance history data with each relative distance history data. Further, the controller 50 compares the first relative speed history data generated at S105 with each second relative speed history data generated at S106.

At S108, the controller 50 specifies the vehicle ID of the immediately front vehicle based on a comparison result of S107. For example, the controller 50 specifies a vehicle ID of a vehicle whose relative distance history data is most close to the inter-vehicle distance history data. Then, when the second relative speed history data of the vehicle having the specified ID is approximately equal to the first relative speed history data, the vehicle having the specified ID is determined as the immediately front vehicle. Further, the controller 50 may extract vehicle IDs of some periphery vehicles whose relative distance history data have similarity degrees with the inter-vehicle distance history data higher than a predetermined degree. Then, among the second relative speed history data of the extracted vehicle IDs, the controller 50 may define a vehicle ID whose second relative speed history data is closest to the first relative speed history data, which is generated based on the inter-vehicle distance history data, as the vehicle ID of the immediately front vehicle. The processes executed at S107 and S108 may operate as a specifying section.

As described above, after the controller 50 specifies the vehicle ID of the immediately front vehicle at S10 in FIG. 3, the controller 50 proceeds to S11. At S11, the controller 50 transmits an immediately adjacent information (IMME INFO) of the host vehicle via the vehicle-to-vehicle communication device 10 in a broadcast manner. The immediately adjacent information includes the vehicle ID of the immediately front vehicle, the vehicle ID of the host vehicle, and the anteroposterior relation between the immediately front vehicle and the host vehicle. Further, the controller 50 may incorporate the immediately adjacent information in the vehicle information set which is transmitted at S4 in FIG. 2.

At S12, the controller 50 determines whether an immediately adjacent information is received from one or more periphery vehicles (PH VC). When the controller 50 determines that the immediately adjacent information is not received from any periphery vehicle, the controller 50 ends the process shown in FIG. 3. When the controller 50 determines that the immediately adjacent information is received from one or more periphery vehicles, the controller 50 proceeds to S13. The processes executed at S11 and S12 may operate as a transceiving section.

At S13, the controller 50 determines the anteroposterior relation of vehicles which travel along the same traffic line with the host vehicle based on the immediately adjacent information received at S12 from the periphery vehicles and previously received immediately adjacent information from the periphery vehicles. Further, when the controller 50 determines the anteroposterior relation of the periphery vehicles, the controller 50 updates the anteroposterior relation of the periphery vehicles. The process executed at S13 may operate as an anteroposterior relation determination section.

Figure 5:
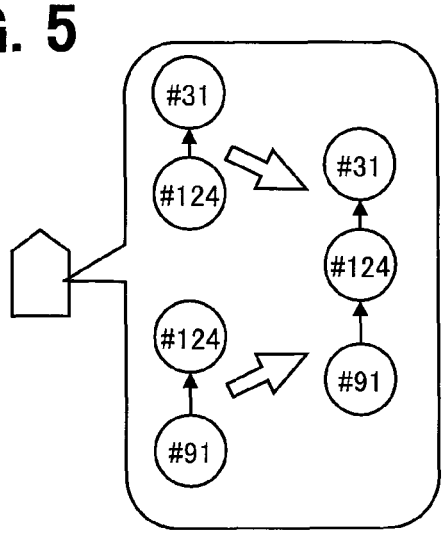
FIG. 5 is a diagram showing a determination method of an anteroposterior relation of vehicles based on immediately adjacent informations.

For example, as shown in FIG. 5, suppose that the controller 50 receives two immediately adjacent informations from a first periphery vehicle and a second periphery vehicle. The immediately adjacent information received from the first periphery vehicle includes a vehicle ID #124 of the first periphery vehicle and a vehicle ID #31 of an immediately front vehicle of the first periphery vehicle. The immediately adjacent information received from the second periphery vehicle includes a vehicle ID #91 of the second periphery vehicle and a vehicle ID #124 of an immediately front vehicle of the second periphery vehicle. Since the vehicle ID #124 is included in both immediately adjacent informations, the controller 50 connects the two immediately adjacent informations and determines an anteroposterior relation of #91, #124, #31 in the first order. FIG. 5 shows a case in which the controller 50 connects only two immediately adjacent informations. Similarly, the controller 50 may determine the anteroposterior relation of more than two vehicles in the one-dimensional direction based on more than two immediately adjacent informations.

The following will describe a convoy joining process (CONVOY JOIN) executed by the controller 50 with reference to FIG. 6. The convoy joining process shown in FIG. 6 is executed when the controller 50 is requested by the driver of the host vehicle to start a convoy travel from a non-convoy travel state.

As shown in FIG. 6, at S20, the controller 50 determines whether the host vehicle travels in a following manner with the immediately front vehicle. That is, the controller 50 determines whether the host vehicle intentionally travels following the immediately front vehicle. Specifically, when the controller 50 determines that the immediately front vehicle specified in the immediately front vehicle specifying process is the same vehicle for a predetermined time period and the inter-vehicle distance to the immediately front vehicle maintains within a predetermined distance for the predetermined time period, the controller 50 may determine that the host vehicle travels in a following manner with the immediately front vehicle.

At S20, when the controller 50 determines that the host vehicle does not travel in a following manner with the immediately front vehicle (S20: NO), the controller 50 performs a report process (not shown) in order to inform the driver that there is no immediately front vehicle to join with and ends the process shown in FIG. 6. When the controller 50 determines that the host vehicle travels in a following manner with the immediately front vehicle (S20: YES), the controller 50 proceeds to S21.

At S21, the controller 50 transmits a convoy joining request (JOIN RQ) to the immediately front vehicle via the vehicle-to-vehicle communication device 10. The transmission of the convoy joining request is transmitted in a broadcast manner. In order to specify a receiving party of the convoy joining request, the controller 50 adds the vehicle ID of the immediately front vehicle to the convoy joining request. The vehicle ID of the immediately front vehicle is specified by performing the process shown in FIG. 4. Since the convoy joining request is transmitted in a broadcast manner, each periphery vehicle receives the convoy joining request. Each periphery vehicle that received the convoy joining request determines whether to respond to the convoy joining request based on the vehicle ID of the receiving party included in the convoy joining request. Further, the controller 50 may transmit the convoy joining request in a unicast manner to the immediately front vehicle other than a broadcast manner.

At S22, the controller 50 determines whether a permission signal (PERMIS) is received from the immediately front vehicle. When the controller 50 determines that the permission signal is received (S22: YES), the controller 50 proceeds to S23. When the controller 50 receives a joining disapproval signal or fails to receive the permission signal within a predetermined time period (S22: NO), the controller 50 ends the process shown in FIG. 6.

At S23, the controller 50 increments the order number (OD NUM) of the immediately front vehicle in the convoy by one. In this case, the order number refers to the first order number. Then, the controller 50 sets the incremented order number as the first order number of the host vehicle in the convoy. The periphery vehicle determination apparatus disposed in the immediately front vehicle executes the process shown in FIG. 2 to transmit the order number of the immediately front vehicle in the convoy to the host vehicle.

The vehicle information transmission process shown in FIG. 2 is executed by the controller 50 during the convoy travel of the host vehicle after the host vehicle is permitted to join the convoy travel. Thus, the order number of the host vehicle in the convoy is added to the vehicle information set of the host vehicle and is transmitted in a broadcast manner by executing the process shown in FIG. 2. Thus, the periphery vehicles traveling in the convoy are informed that the host vehicle is joined to the convoy and is also informed of the vehicle ID of the host vehicle.

During the convoy travel, a process shown in FIG. 7 is periodically executed by the controller 50. At S30, the controller 50 determines whether a convoy joining request, which is transmitted from a periphery vehicle, is received. Specifically, the convoy joining request is usually transmitted from a following vehicle, which is one of the periphery vehicles. The following vehicle may specify a receiving party of the convoy joining request and transmits the convoy joining request by performing S21 in FIG. 6. When the controller 50 determines that the convoy joining request is not received from any following vehicle (S30: NO), the controller 50 ends the process shown in FIG. 7. When the controller 50 determines that the convoy joining request is received from a following vehicle (S30: YES), the controller 50 proceeds to S31.

At S31, the controller 50 determines whether the number of vehicles traveling in the convoy is equal to a maximum capacity (MAX). The maximum capacity of the convoy may be preliminarily defined as, for example, five, and is stored in the storage device 40. The order number of the host vehicle in the convoy is determined by performing S23 in FIG. 6. When the controller 50 executes the process at S23 in FIG. 6, the controller 50 can determine that the host vehicle is the tail end vehicle in the convoy at that time. When the controller 50 determines that the host vehicle is the tail end vehicle in the convoy, the order number of the host vehicle is equal to the number of vehicles traveling in the convoy. The controller 50 compares the number of vehicles in the convoy with the maximum capacity of the convoy stored in the storage device 40. When the controller 50 determines that the number of vehicles in the convoy is equal to the maximum capacity (S31: YES), the controller 50 transmits the joining disapproval signal to the following vehicle, which is not shown, and ends the process shown in FIG. 7. When the controller 50 determines that the number of vehicles in the convoy is smaller than the maximum capacity (S31: NO), the controller 50 proceeds to S32. At S32, the controller 50 transmits the permission signal to the following vehicle. The permission signal is transmitted in a broadcast manner, which has a high capacity efficiency. The permission signal may also be transmitted in a unicast manner when the capacity efficiency of the unicast communication is not substantially degraded.

Figure 8:
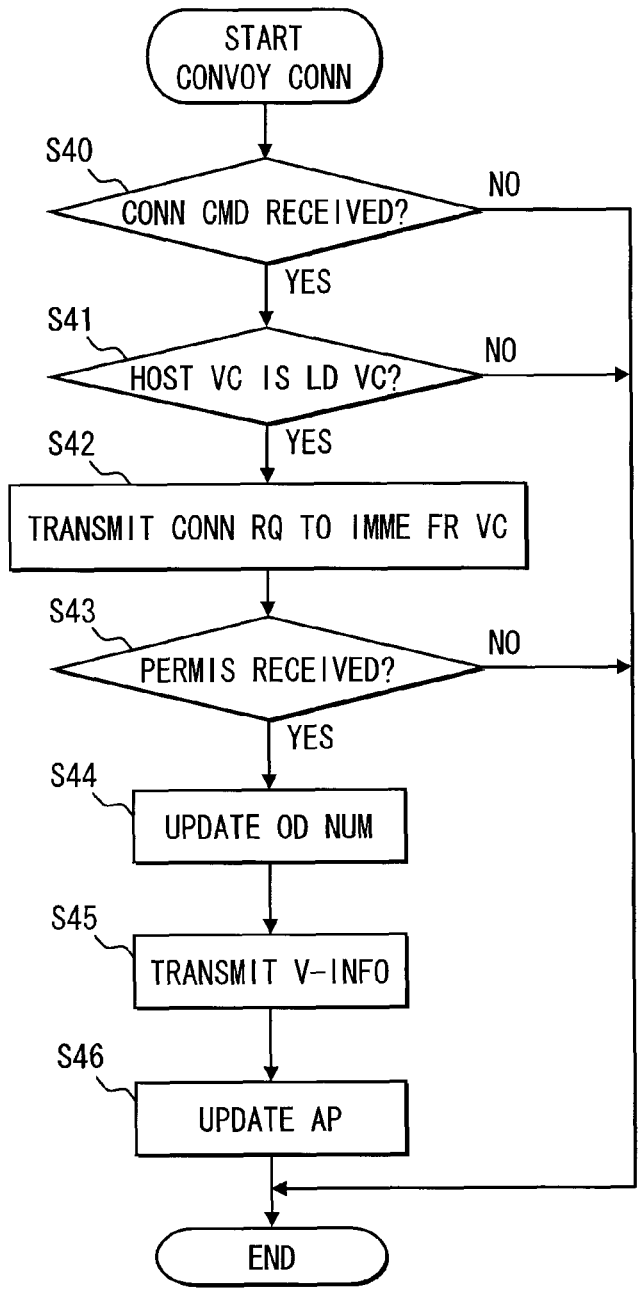
FIG. 8 is a flowchart showing a convoy connection process executed by the controller during the convoy travel.

The following will describe a convoy connection process (CONVOY CONN) executed by the controller 50 during the convoy travel with reference to FIG. 8. The process shown in FIG. 8 is periodically executed by the controller 50. The controller 50 executes the convoy connection process in order to connect the convoy in which the host vehicle travels with a front convoy. Herein, the front convoy refers to a group of periphery vehicles traveling in front of the host vehicle. A tail end vehicle of the front convoy is the immediately front vehicle of the host vehicle. At S40, the controller 50 determines whether a convoy connection command (CONN CMD) is received. The convoy connection command is transmitted from a superior controller (not shown) to the controller 50. The superior controller generates the convoy connection command in response to an operation of the driver of the host vehicle.

When the controller 50 determines that the convoy connection command is not received (S40: NO), the controller 50 ends the process shown in FIG. 8. When the controller 50 determines that the convoy connection command is received (S40: YES), the controller 50 determines whether the host vehicle (HOST VC) is a leading vehicle (LD VC) of the convoy in which the host vehicle travels at S41. The process executed at S41 may operate as a leading vehicle determination section. Hereinafter, the convoy in which the host vehicle travels is also referred to as a subject convoy. The controller 50 may determine whether the host vehicle is the leading vehicle in the subject convoy by determining whether the host vehicle travels in a following manner with the immediately front vehicle and whether an immediately following vehicle travels in a following manner with the host vehicle. Herein, the immediately following vehicle is a closest vehicle in the backward direction with respect to the host vehicle. When the controller 50 determines that the host vehicle does not travel in a following manner with the immediately front vehicle and the immediately following vehicle travels in a following manner with the host vehicle, the controller 50 determines that the host vehicle is the leading vehicle of the subject convoy.

When the controller 50 determines that the host vehicle is not the leading vehicle of the subject convoy (S41: NO), the controller 50 ends the process shown in FIG. 8. When the controller 50 determines that the host vehicle is the leading vehicle of the subject convoy (S41: YES), the controller 50 proceeds to S42. At S42, the controller 50 transmits the convoy connection request (CONN RQ) to the immediately front vehicle via the vehicle-to-vehicle communication device 10. In this case, the immediately front vehicle of the host vehicle is the tail end vehicle of the front convoy. The controller 50 may transmit the convoy connection request in a broadcast manner or in a unicast manner, similar to the permission signal. The convoy connection request further includes the number of vehicles included in the subject convoy.

The following process, which is not shown in the drawings, is executed by the tail end vehicle of the front convoy when the tail end vehicle of the front convoy receives the convoy connection request from the host vehicle of the subject convoy. When the tail end vehicle of the front convoy receives the convoy connection request from the host vehicle of the subject convoy, the tail end vehicle of the front convoy determines the number of vehicles included in the subject convoy, which requests the convoy connection. The tail end vehicle of the front convoy determines whether a sum of the number of vehicles included in front convoy and the number of vehicles included in the subject convoy is larger than the maximum capacity of the front convoy. When the tail end vehicle of the front convoy determines that the sum of the number the number of vehicles included in front convoy and the number of vehicles included in the subject convoy is equal to or smaller than the maximum capacity of the front convoy, the tail end vehicle of the front convoy transmits a permission signal to the host vehicle of the subject convoy in response to the convoy connection request. When the tail end vehicle of the front convoy determines that the sum of the number the number of vehicles included in front convoy and the number of vehicles included in the subject convoy is larger than the maximum capacity of the front convoy, the tail end vehicle of the front convoy transmits a disapproval signal to the host vehicle of the subject convoy in response to the convoy connection request.

At S43, the controller 50 determines whether the permission signal (PERMIS) is received from the immediately front vehicle (tail end vehicle of the front convoy) in response to the convoy connection request. The process executed at S43 may operate as a connection determination section. When the controller 50 determines that the permission signal is received from the immediately front vehicle in response to the convoy connection request (S43: YES), the controller 50 controls the host vehicle to travel in a following manner with the immediately front vehicle and proceeds to S44. When the controller 50 determines that the disapproval signal is received from the immediately front vehicle in response to the convoy connection request or the permission signal is not received within a predetermined time period (S43: NO), the controller 50 ends the process shown in FIG. 8.

At S44, the controller 50 updates the order number (OD NUM) of the host vehicle in the subject convoy. Before connecting the subject convoy with the front convoy, the order number (first order number) of the host vehicle is one. The controller 50 updates the order number of the host vehicle to a new order number (first order number). The order number of the immediately front vehicle (tail end vehicle of the front convoy) in the front convoy is incremented by one and assigned to the host vehicle as the new order number. The controller 50 may determine the order number of the immediately front vehicle in the front convoy based on the vehicle information set transmitted from the immediately front vehicle.

At S45, the controller 50 transmits the host vehicle information set including the new order number determined at S44 by executing the process shown in FIG. 2. Thus, front vehicles and following vehicles of the host vehicle in a connected convoy, which is generated by the connection of the front convoy and the subject convoy, are informed that the number of vehicles included in the connected convoy is changed.

At S46, the controller 50 determines the anteroposterior relation (AP) of the vehicles included in the connected convoy. The process executed at S46 may operate as an anteroposterior relation determination section. As described above in S13 of FIG. 3, the controller 50 determines the anteroposterior relation by correlating the immediately adjacent informations transmitted from the periphery vehicles based on the vehicle IDs included in the immediately adjacent informations. The anteroposterior relation determined at S46 does not exactly correspond to the connected convoy. That is, the anteroposterior relation determined at S46 may include an anteroposterior relation of vehicles that are not included in the connected convoy. The controller 50 may determine a part of the anteroposterior relation corresponding to the connected convoy based on each information, which indicates the position of each periphery vehicle in the connected convoy and is transmitted from each periphery vehicle. As described above, the information indicating the position of each periphery vehicle in the convoy may include the number of vehicles included in the convoy and one of the first order number and the second order number. Alternatively, the information indicating the position of each periphery vehicle in the convoy may include first order number and the second order number.

The controller 50 may transmit the host vehicle information set in the vehicle information transmission process shown in FIG. 2 without executing S45 in FIG. 8, and may determine the anteroposterior relation in the connected convoy in the anteroposterior relation determination process shown in FIG. 3 without executing S46 in FIG. 8.

The process shown in FIG. 8 is executed by the host vehicle, which is the leading vehicle of the subject convoy, in order to update the anteroposterior relation in the connected convoy. After the connection of the subject convoy and the front convoy, the periphery vehicles included in the subject convoy may update the anteroposterior relation in the connected convoy by executing the anteroposterior relation determination process shown in FIG. 3.

Figure 9:
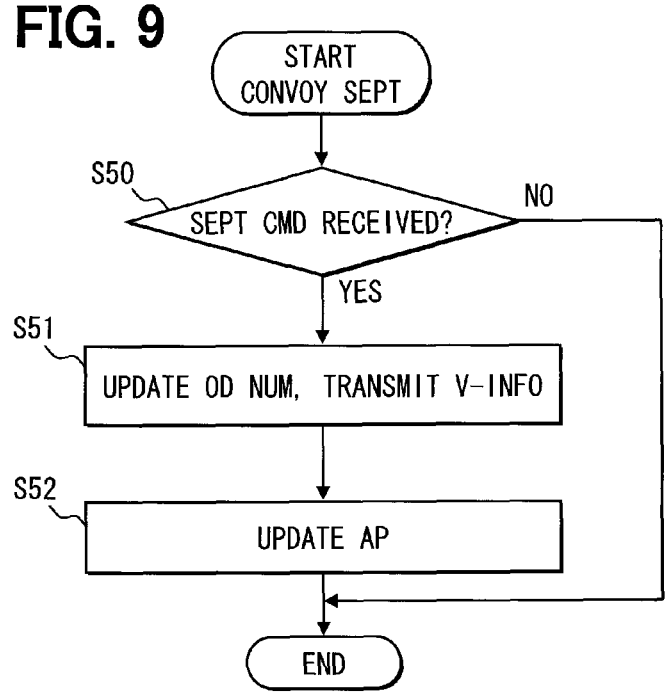
FIG. 9 is a flowchart showing a convoy separation process from a convoy executed by the controller during the convoy travel.

The following will describe a convoy separation process (CONVOY SEPT), which is executed by the controller 50 when the host vehicle separates from the subject convoy with reference to FIG. 9. The process shown in FIG. 9 is periodically executed by the controller 50. As shown in FIG. 9, at S50, the controller 50 determines whether a separation command (SEPT CMD) is received. The process executed at S50 may operate as a separation determination section. The separation command is transmitted from the superior controller (not shown) to the controller 50. The superior controller generates the separation command in response to an operation of the driver of the host vehicle. Hereinafter, the subject convoy in which the host vehicle travels before the separation is referred to as a pre-separation convoy, and the subject convoy in which the host vehicle travels after the separation is referred to as a post-separation convoy.

When the controller 50 determines that the separation command is not received (S50: NO), the controller 50 ends the process shown in FIG. 9. When the controller 50 determines that the separation command is received (S50: YES), the controller 50 proceeds to S51.

At S51, the controller 50 updates the order number of the host vehicle in the pre-separation convoy to an order number of the host vehicle in the post-separation convoy. Since the host vehicle separates from the pre-separation convoy, the order number (first order number) of the host vehicle in the post-separation convoy is updated to one. Then, the controller 50 transmits the host vehicle information set including the updated order number of the host vehicle via the vehicle-to-vehicle communication device 10 in a broadcast manner.

At S52, the controller 50 determines the anteroposterior relation of the vehicles included in the post-separation convoy. The process executed at S52 may operate as an anteroposterior relation determination section. The process executed at S52 is similar to the process executed at S46. The controller 50 may transmit the host vehicle information set in the vehicle information transmission process shown in FIG. 2 without executing the transmission of the host vehicle information set in S51 of FIG. 9. Further, the controller 50 may determine the anteroposterior relation in the post-separation convoy in the anteroposterior relation determination process shown in FIG. 3 without executing S52 in FIG. 9.

Figure 10:
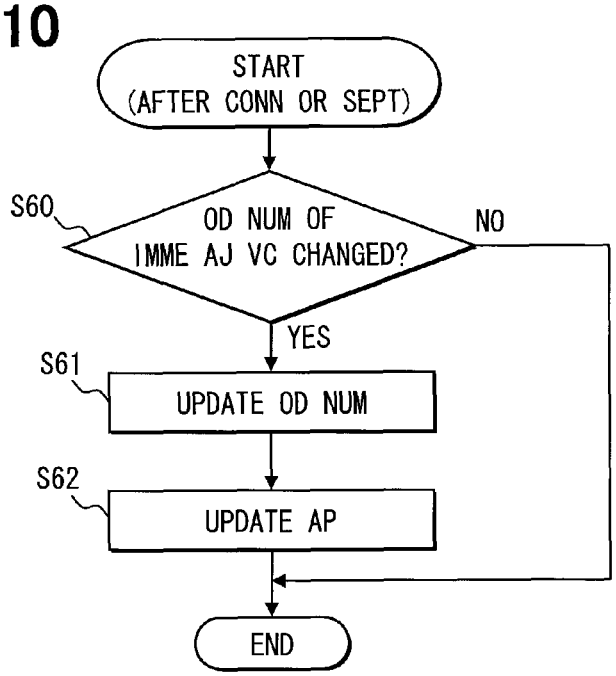
FIG. 10 is a flowchart showing a convoy separating process executed by a controller of a following vehicle during the convoy travel.

The following will describe a process executed by the controller 50 when a leading vehicle of the subject convoy in which the host vehicle is included connects with the front convoy or when a front vehicle of the host vehicle separates from the subject convoy (pre-separation convoy) with reference to FIG. 10. As shown in FIG. 10, during the convoy travel, the controller 50 determines whether at least one order numbers of immediately adjacent vehicles is changed at S60. Herein, the immediately adjacent vehicles include the immediately front vehicle and the immediately following vehicle with respect to the host vehicle. Specifically, the controller 50 determines whether a current order number of the immediately front vehicle is changed compared with immediately previous order number of the immediately front vehicle, and determines whether a current order number of the immediately following vehicle is changed from an immediately previous order number of the immediately following vehicle. When the controller 50 determines that the current order number of the immediately front vehicle or the current order number of the immediately following vehicle is changed, the controller 50 changes the order number of the host vehicle compared with the current order number of the immediately front vehicle or the current order number of the immediately following vehicle. The current order number and the immediately previous order number of the immediately front vehicle are included in the vehicle information set transmitted periodically from the immediately front vehicle. The current order number and the immediately previous order number of the immediately following vehicle are included in the vehicle information set transmitted periodically from the immediately following vehicle. The controller 50 then determines the anteroposterior relation of the periphery vehicles included in the convoy by correlating the immediately adjacent informations from the periphery vehicles included in the convoy based on the repeated identification information, which is included in at least two of the immediately adjacent informations. The process executed at S60 may operate as a change determination section.

When the controller 50 determines that at least one order numbers of the immediately adjacent vehicles is changed (S60: YES), the controller 50 proceeds to S61. At S61, the controller 50 increments the order number of the immediately front vehicle by one, and assigns the incremented order number to the host vehicle. In this case, the order number of the immediately front vehicle has been updated caused by the connection with the front convoy or the separation from the pre-separation convoy. That is, the controller 50 updates the order number of the host vehicle at S61. The process executed at S61 may operate as an order number updating section. At S62, the controller 50 updates the anteroposterior relation of the vehicles included in the subject convoy. The process executed at S62 may operate as an anteroposterior relation determination section. The process executed at S62 is similar to the process executed at S46 in FIG. 8 and the process executed at S52 in FIG. 9.

As described above, in the present embodiment, the periphery vehicle determination apparatus 1 determines the anteroposterior relation of the periphery vehicles in the one-dimensional direction (S13, S46, S52, S62) by correlating the immediately adjacent informations transmitted from the periphery vehicles. Thus, the periphery vehicle determination apparatus 1 can determine the anteroposterior relation of the periphery vehicles traveling in a convoy even when the host vehicle travels outside of the convoy. Further, when the host vehicle travels in the convoy, the periphery vehicle determination apparatus 1 can determine the anteroposterior relation of the vehicles included in the convoy by executing a similar process. Further, the periphery vehicle determination apparatus 1 can determine the anteroposterior relation of the periphery vehicles outside of the convoy when the host vehicle travels in the convoy.

The anteroposterior relation of the periphery vehicles in the convoy is determined (S13, S46, S52, S62) based on the immediately adjacent informations transmitted in a broadcast manner. Thus, a communication load is reduced.

As described above with reference to FIG. 8 to FIG. 10, when the host vehicle joins the front convoy or the host vehicle separates from the pre-separation convoy, the periphery vehicle determination apparatus 1 can determine the anteroposterior relation of the periphery vehicles included in the convoy by executing S46 in FIG. 8, S52 in FIG. 9 and S62 in FIG. 10, which are similar to S13 in FIG. 3. Thus, the anteroposterior relation of the periphery vehicles included in the convoy is determined in an easy way even when the host vehicle joins the front convoy or the host vehicle separates from the pre-separation convoy. That is, special processes are not necessary when determining the anteroposterior relation of the periphery vehicles in different cases, including connection of convoy and separation from the convoy.

In the present embodiment, when the leading vehicle of the subject convoy joins the front convoy, a following vehicle in the subject convoy can promptly update the anteroposterior relation of the connected convoy by executing S60 to S62 in FIG. 10. Further, when a front vehicle in the subject convoy separates from the pre-separation convoy, a following vehicle of the front vehicle can promptly update the anteroposterior relation in the post-separation convoy by executing S60 to S62 in FIG. 10.

In the foregoing embodiment, the radar detector 20 operates as the behavior obtaining section, which obtains the behavior related information of the immediately adjacent object. The behavior related information of the immediately adjacent object includes the position of the immediately adjacent object and the speed parameter of the immediately adjacent object.

In the present embodiment, the anteroposterior relation determination section specifies the anteroposterior relation of the periphery vehicles in the one-dimensional direction by correlating the immediately adjacent informations transmitted from the periphery vehicles. Thus, when the host vehicle travels in a convoy, the anteroposterior relation of the periphery vehicles included in the convoy and the anteroposterior relation of the periphery vehicles out of the convoy are determined. Further, when the host vehicle travels out of the convoy, the anteroposterior relation of the periphery vehicles traveling in the convoy is determined.

(First Modification)

In the foregoing embodiment, the radar detector 20 operates as the behavior obtaining section, which obtains the behavior related information of the immediately adjacent object. Further, a position of each periphery vehicle determined based on a real-time kinematic global positioning system (RTKGPS) may also be used as the behavior related information. That is, the periphery vehicle determination apparatus 1 may receive the position detected based on the RTKGPS (hereinafter, referred to as RTKGPS based position) as the behavior related information via the vehicle-to-vehicle communication device 10. In this case, the vehicle-to-vehicle communication device 10 operates as the behavior obtaining section.

The periphery vehicle determination apparatus 1 may receive each RTKGPS based position of each periphery vehicle via the vehicle-to-vehicle communication device 10. Since the RTKGPS based position has a high precision, the periphery vehicle determination apparatus 1 can specify the immediately front vehicle based on only the RTKGPS based position without executing the processes at S107 and S108 (specifying section) in FIG. 4.

The RTKGPS based position is generated by compensating a position detected based on the GPS (hereinafter referred to as a GPS based position) with compensation information. Thus, the RTKGPS based position has the high precision. The compensation information is commonly used within a predetermined range. Thus, the position of the immediately front vehicle may also be determined based on information generated by compensating the GPS based position of each periphery vehicle with the compensation information. Further, the position information of the immediately front vehicle, the GPS based position, and the compensation information may be added to the vehicle information set of each periphery vehicle.

(Second Modification)

Further, a camera that captures images of a front region of the host vehicle may operate as the behavior obtaining section. When a front camera is equipped in the host vehicle, a taillight of the host vehicle may be modulated to incorporation the vehicle identification information of the host vehicle in order to inform the vehicle identification information of the host vehicle to the following vehicle. The following vehicle may demodulate a waveform indicating a brightness variation of the taillight of the front vehicle included in the captured images by the camera in order to obtain the vehicle identification information of the front vehicle. With this configuration, the front camera may obtain the behavior related information and vehicle identification information (vehicle ID) of the immediately front vehicle. That is, the front camera may operate as the behavior obtaining section and the information obtaining section.

(Other Modifications)

In the foregoing embodiment, the immediately front vehicle is determined by comparing the multiple distance history data and the multiple speed history data by executing processes at S106 and S107 in FIG. 4. Further, the immediately front vehicle may be determined by comparing only the multiple distance history data or only the multiple speed history data. Further, one record of previous distance or speed may be compared other than the multiple history data. Further, acceleration information may be used instead of the speed related information, or acceleration information in addition to the speed information may be used as the speed related information.

In the foregoing embodiment, the radar detector 20 detects an object in the forward direction with respect to the host vehicle as the immediately adjacent object. Further, the radar detector 20 may detect an object in the backward direction as immediately adjacent object.

While only the selected exemplary embodiments have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiments according to the present disclosure is provided for illustration only, and not for the purpose of limiting the disclosure as defined by the appended claims and their equivalents.

What is claimed is:

1. A periphery vehicle determination apparatus disposed in a host vehicle comprising:
 a behavior obtaining section that obtains a behavior related information of an immediately adjacent object of the host vehicle, wherein the immediately adjacent object refers to one of an immediately front object and an immediately following object, and the behavior related information includes at least one of a position of the immediately adjacent object and a speed related parameter of the immediately adjacent object;
 a vehicle-to-vehicle communication device that communicates with a plurality of periphery vehicles;
 an information obtaining section that obtains a plurality of vehicle information sets from the periphery vehicles via the vehicle-to-vehicle communication device, wherein each of the vehicle information sets includes an identification information of a respective one of the periphery vehicles;
 a specifying section that specifies one of the vehicle information sets obtained by the information obtaining section as being from an immediately adjacent vehicle based on the behavior related information of the immediately adjacent object obtained by the behavior obtaining section, and specifies the identification information of the immediately adjacent vehicle based on the vehicle information set specified as from the immediately adjacent vehicle, wherein the immediately adjacent vehicle is one of an immediately front vehicle and an immediately following vehicle, and the immediately front vehicle and the immediately following vehicle are part of the plurality of periphery vehicles;
 a transceiving section that transmits an immediately adjacent information of the host vehicle to the periphery vehicles and receives a plurality of immediately adjacent informations from the periphery vehicles via the vehicle-to-vehicle communication device, wherein the immediately adjacent information of the host vehicle includes an identification information of the host vehicle, the identification information of the immediately adjacent vehicle, and an anteroposterior relation between the host vehicle and the immediately adjacent vehicle;

an anteroposterior relation determination section that specifies an anteroposterior relation of at least two of the periphery vehicles in a one-dimensional direction by correlating the immediately adjacent informations transmitted from the periphery vehicles according to a repeated identification information that is the identification information included in at least two of the immediately adjacent informations from the periphery vehicles, wherein the one-dimensional direction is defined as along the travel direction of the host vehicle at least one of a forward direction with respect to the host vehicle and a backward direction with respect to the host vehicle;

a leading vehicle determination section that determines a leading vehicle of a subject convoy in which the host vehicle is included; and a combination determination section that determines whether to connect with a front convoy when the leading vehicle determination section determines that the host vehicle is the leading vehicle of the subject convoy, wherein, when the combination determination section determines to connect the subject convoy with the front convoy, the anteroposterior relation determination section determines an anteroposterior relation of the periphery vehicles included in a connected convoy, which is generated by connecting the subject convoy with the front convoy, by correlating the immediately adjacent informations from the periphery vehicles included in the connected convoy based on the repeated identification information that is the identification information included in at least two of the immediately adjacent informations.

2. The periphery vehicle determination apparatus according to claim 1, further comprising:

a first behavior determination section that determines a relative behavior of the immediately adjacent object relative to the host vehicle based on the behavior related information of the immediately adjacent object obtained from the behavior obtaining section and a behavior related information of the host vehicle; and a second behavior determination section that determines a relative behavior of each of the periphery vehicles relative to the host vehicle based on a behavior related information of each of the periphery vehicles and the behavior related information of the host vehicle, wherein the behavior related information of each of the periphery vehicles is included in the vehicle information set of each of the periphery vehicles, and wherein the specifying section specifies the one of the vehicle information sets transmitted from the immediately adjacent vehicle by comparing the relative behavior of the immediately adjacent object with the relative behavior of each of the periphery vehicles.

3. The periphery vehicle determination apparatus according to claim 2, wherein the behavior information of the host vehicle includes at least one of a position of the host vehicle and a speed related parameter of the host vehicle.

4. The periphery vehicle determination apparatus according to claim 1, further comprising:

a change determination section that determines whether a current order number of the immediately front vehicle in a convoy is changed compared with an immediately previous order number of the immediately front vehicle, and determines whether a current order number of the immediately following vehicle in the convoy is changed compared with an immediately previous order number of the immediately following vehicle; and an order number updating section that changes an order number of the host vehicle in the convoy based on the current order number of the immediately front vehicle and the current order number of the immediately following vehicle when the change determination section determines that one of the current order number of the immediately front vehicle and the current order number of the immediately following vehicle is changed, wherein the current order number and the immediately previous order number of the immediately front vehicle are included in the vehicle information sets transmitted periodically from the immediately front vehicle, wherein the current order number and the immediately previous order number of the immediately following vehicle are included in the vehicle information sets transmitted periodically from the immediately following vehicle, and wherein the anteroposterior relation determination section determines an anteroposterior relation of the periphery vehicles included in the convoy by correlating the immediately adjacent informations from the periphery vehicles included in the convoy based on the repeated identification information that is the identification information included in at least two of the immediately adjacent informations.

5. The periphery vehicle determination apparatus according to claim 1, wherein the immediately adjacent information from each of the periphery vehicles includes the identification information of the each of the periphery vehicles, the identification information of an immediately adjacent vehicle of the each of the periphery vehicles, and an anteroposterior relation between each of the periphery vehicles and the immediately adjacent vehicle of each of the periphery vehicles.

6. A periphery vehicle determination apparatus disposed in a host vehicle comprising:

a behavior obtaining section that obtains a behavior related information of an immediately adjacent object of the host vehicle, wherein the immediately adjacent object refers to one of an immediately front object and an immediately following object, and the behavior related information includes at least one of a position of the immediately adjacent object and a speed related parameter of the immediately adjacent object;

a vehicle-to-vehicle communication device that communicates with a plurality of periphery vehicles;

an information obtaining section that obtains a plurality of vehicle information sets from the periphery vehicles via the vehicle-to-vehicle communication device, wherein each of the vehicle information sets includes an identification information of a respective one of the periphery vehicles;

a specifying section that specifies one of the vehicle information sets obtained by the information obtaining section as being from an immediately adjacent vehicle based on the behavior related information of the immediately adjacent object obtained by the behavior obtaining section, and specifies the identification information of the immediately adjacent vehicle based on the vehicle information set specified as from the immediately adjacent vehicle, wherein the immediately adjacent vehicle is one of an immediately front vehicle and an immediately following vehicle, and the immediately front vehicle and the immediately following vehicle are part of the plurality of periphery vehicles;

a transceiving section that transmits an immediately adjacent information of the host vehicle to the periphery vehicles and receives a plurality of immediately adjacent informations from the periphery vehicles via the vehicle-to-vehicle communication device, wherein the immediately adjacent information of the host vehicle includes an identification information of the host vehicle, the identification information of the immediately adjacent vehicle, and an anteroposterior relation between the host vehicle and the immediately adjacent vehicle;

an anteroposterior relation determination section that specifies an anteroposterior relation of at least two of the periphery vehicles in a one-dimensional direction by correlating the immediately adjacent informations transmitted from the periphery vehicles according to a repeated identification information that is the identification information included in at least two of the immediately adjacent informations from the periphery vehicles, wherein the one-dimensional direction is defined as along the travel direction of the host vehicle at least one of a forward direction with respect to the host vehicle and a backward direction with respect to the host vehicle; and a separation determination section that determines, during a convoy travel, whether to separate the host vehicle from a pre-separation convoy, wherein the pre-separation convoy refers to a convoy in which the host vehicle travels before a separation, and a post-separation convoy refers to a convoy in which the host vehicle travels after the separation, and wherein, when the separation determination section determines to separate the host vehicle from the pre-separation convoy, the anteroposterior relation determination section determines an anteroposterior relation of the periphery vehicles included in the post-separation convoy by correlating the immediately adjacent informations from the periphery vehicles included in the post-separation convoy based on the repeated identification information that is the identification information included in at least two of the immediately adjacent informations.

7. The periphery vehicle determination apparatus according to claim 6, further comprising:

a first behavior determination section that determines a relative behavior of the immediately adjacent object relative to the host vehicle based on the behavior related information of the immediately adjacent object obtained from the behavior obtaining section and a behavior related information of the host vehicle; and a second behavior determination section that determines a relative behavior of each of the periphery vehicles relative to the host vehicle based on a behavior related information of each of the periphery vehicles and the behavior related information of the host vehicle, wherein the behavior related information of each of the periphery vehicles is included in the vehicle information set of each of the periphery vehicles, and wherein the specifying section specifies the one of the vehicle information sets transmitted from the immediately adjacent vehicle by comparing the relative behavior of the immediately adjacent object with the relative behavior of each of the periphery vehicles.

8. The periphery vehicle determination apparatus according to claim 6, further comprising:

a change determination section that determines whether a current order number of the immediately front vehicle in a convoy is changed compared with an immediately previous order number of the immediately front vehicle, and determines whether a current order number of the immediately following vehicle in the convoy is changed compared with an immediately previous order number of the immediately following vehicle; and an order number updating section that changes an order number of the host vehicle in the convoy based on the current order number of the immediately front vehicle and the current order number of the immediately following vehicle when the change determination section determines that one of the current order number of the immediately front vehicle and the current order number of the immediately following vehicle is changed, wherein the current order number and the immediately previous order number of the immediately front vehicle are included in the vehicle information sets transmitted periodically from the immediately front vehicle, wherein the current order number and the immediately previous order number of the immediately following vehicle are included in the vehicle information sets transmitted periodically from the immediately following vehicle, and wherein the anteroposterior relation determination section determines an anteroposterior relation of the periphery vehicles included in the convoy by correlating the immediately adjacent informations from the periphery vehicles included in the convoy based on the repeated identification information that is the identification information included in at least two of the immediately adjacent informations.

9. The periphery vehicle determination apparatus according to claim 6, wherein the immediately adjacent information from each of the periphery vehicles includes the identification information of the each of the periphery vehicles, the identification information of an immediately adjacent vehicle of the each of the periphery vehicles, and an anteroposterior relation between each of the periphery vehicles and the immediately adjacent vehicle of each of the periphery vehicles.

* * * * *